(12) United States Patent
Boving

(10) Patent No.: US 10,949,678 B2
(45) Date of Patent: Mar. 16, 2021

(54) DEVICE AND METHOD FOR DISPLAYING REGIONS INCLUDING A PORTION ON A SCREEN THAT IS CONCEALED BY AN OBJECT

(71) Applicant: GRAMMER AG, Amberg (DE)

(72) Inventor: Marko Boving, Regensburg (DE)

(73) Assignee: GRAMMER AG, Ursensollen (DE)

( * ) Notice: Subject to any disclaimer, the term of this patent is extended or adjusted under 35 U.S.C. 154(b) by 25 days.

(21) Appl. No.: 16/018,319

(22) Filed: Jun. 26, 2018

(65) Prior Publication Data
US 2019/0005337 A1 Jan. 3, 2019

(30) Foreign Application Priority Data
Jun. 29, 2017 (DE) .......................... 102017114450.1

(51) Int. Cl.
| | | |
|---|---|---|
| G09G 5/00 | (2006.01) |
| G06K 9/00 | (2006.01) |
| G02B 27/01 | (2006.01) |
| B60R 11/02 | (2006.01) |
| B60R 1/00 | (2006.01) |

(Continued)

(52) U.S. Cl.
CPC ............ G06K 9/00791 (2013.01); B60R 1/00 (2013.01); B60R 11/02 (2013.01); E02F 9/261 (2013.01); G02B 27/01 (2013.01); G06F 3/013 (2013.01); H04N 5/2253 (2013.01); B60R 2300/202 (2013.01); B60R 2300/303 (2013.01); B60R 2300/306 (2013.01); B60R 2300/605 (2013.01);

(Continued)

(58) Field of Classification Search
None
See application file for complete search history.

(56) References Cited

U.S. PATENT DOCUMENTS

2003/0201895 A1* 10/2003 Harter, Jr. .............. B60K 37/02
340/575
2007/0070197 A1 3/2007 Akatsuka et al.
(Continued)

FOREIGN PATENT DOCUMENTS

| DE | 102013019114 | 5/2015 |
| DE | 102015204743 | 9/2016 |

(Continued)

OTHER PUBLICATIONS

Official Action for German Patent Application No. 102017114450. 1, dated Apr. 9, 2018, 3 pages.
(Continued)

*Primary Examiner* — Kirk W Hermann
(74) *Attorney, Agent, or Firm* — Sheridan Ross P.C.

(57) ABSTRACT

A utility vehicle comprising a device for displaying a portion on a screen, the portion being concealed by an object at least in part, and the object being arranged between the portion and a vehicle driver and the screen being arranged between the vehicle driver and the object, the portion being in a region that is recorded by a camera setup, the device having a determination device that is provided and set up to determine a position of at least one eye of the vehicle driver and a position of the screen, the determination device determining the position of the portion in the recorded region using the position of the eye and the position of the screen, and this portion being represented by the screen.

13 Claims, 4 Drawing Sheets

(51) Int. Cl.
  *E02F 9/26* (2006.01)
  *G06F 3/01* (2006.01)
  *H04N 5/225* (2006.01)
  *G02B 27/00* (2006.01)

(52) U.S. Cl.
  CPC .. *G02B 27/0093* (2013.01); *G02B 2027/0187* (2013.01)

(56) References Cited

U.S. PATENT DOCUMENTS

| | | | |
|---|---|---|---|
| 2007/0081262 A1 | 4/2007 | Oizumi et al. | |
| 2007/0156317 A1* | 7/2007 | Breed | B60N 2/002 |
| | | | 701/45 |
| 2008/0012938 A1 | 1/2008 | Kubota et al. | |
| 2008/0079753 A1* | 4/2008 | Victor | G01C 21/365 |
| | | | 345/660 |
| 2010/0253494 A1* | 10/2010 | Inoue | G01C 21/36 |
| | | | 340/436 |
| 2010/0289899 A1* | 11/2010 | Hendron | B60R 1/00 |
| | | | 348/148 |
| 2013/0016102 A1* | 1/2013 | Look | G06T 15/20 |
| | | | 345/426 |
| 2013/0095924 A1* | 4/2013 | Geisner | G09B 19/0038 |
| | | | 463/32 |
| 2014/0085342 A1* | 3/2014 | Shoemaker | G06K 9/00355 |
| | | | 345/672 |
| 2016/0257252 A1* | 9/2016 | Zaitsev | G06K 9/00791 |
| 2017/0076606 A1* | 3/2017 | Gupta | G08G 1/167 |
| 2017/0161950 A1* | 6/2017 | Seder | G02B 27/01 |
| 2017/0280024 A1* | 9/2017 | Murugesan | H04N 1/622 |
| 2019/0129177 A1* | 5/2019 | Roimi | G02B 27/0093 |

FOREIGN PATENT DOCUMENTS

| | | | |
|---|---|---|---|
| DE | 102015204746 | 9/2016 | |
| DE | 102016123566 | 6/2017 | |
| JP | H10-299032 | 11/1998 | |
| JP | 2007-096638 | 4/2007 | |
| JP | 2008-307982 | 12/2008 | |
| JP | 2016-102312 | 6/2016 | |
| WO | WO-2016115052 A1 * | 7/2016 | ............ G02B 27/01 |
| WO | WO-2016151581 A1 * | 9/2016 | ............ G06F 3/013 |

OTHER PUBLICATIONS

Extended Search Report for European Patent Application No. 18172652.2, dated Dec. 4, 2018, 2 pages.

* cited by examiner

DEVICE AND METHOD FOR DISPLAYING REGIONS INCLUDING A PORTION ON A SCREEN THAT IS CONCEALED BY AN OBJECT

CROSS-REFERENCE TO RELATED APPLICATIONS

This application claims the benefit of German Patent Application No. 10 2017 114 450.1 filed Jun. 29, 2017, the entire contents of which are incorporated herein by reference.

FIELD

The invention relates to a utility vehicle comprising a device for displaying a portion on a screen, the portion being concealed by an object at least in part, and the object being arranged between the portion and a vehicle driver and the screen being arranged between the vehicle driver and the object, the portion being located in a region that is recorded by a camera setup.

BACKGROUND

Camera systems are known from the prior art, particularly from security technology or surveillance technology, by means of which, regions that are to be monitored can be displayed on monitors and thus monitored. However, in this case, not only a concealed part of the recorded region is displayed, but rather the entire recorded region. Likewise, no field of application in the agricultural sector for making regions that are concealed—for example by accessory equipment or parts of the vehicle—visible to a vehicle driver, is known from the prior art.

SUMMARY

The object of the present invention is therefore to provide a device for a utility vehicle by means of which concealed portions can be made visible to a vehicle driver.

This object is achieved according to the features of claim 1. Advantageous embodiments of the invention are set out in the dependent claims.

The basic concept of the invention is to provide a utility vehicle comprising a device for displaying a portion on a screen, the portion being concealed by an object at least in part, and the object being arranged between the portion and a vehicle driver and the screen being arranged between the vehicle driver and the object, the portion being in a region that is recorded by a camera setup, the device having a determination device that is provided and set up to determine a position of at least one eye of the vehicle driver and a position of the screen, the determination device determining the position of the portion in the recorded region using the position of the eye and the position of the screen, and this portion being represented by the screen.

For example, a portion is concealed by a support column of the vehicle cabin but the vehicle driver is also keen to observe this region behind the support column. An example of this could be a combine harvester during the use of which it is important to be able to observe as far as possible the entire region of the mower unit. Parts of the mower unit are concealed from the vehicle driver by the cabin pillars. Displaying, in the manner according to the invention, the region that is concealed by the cabin pillars, and arranging the screens in the manner according to the invention allows the vehicle driver to effortlessly observe the entire region of the mower unit. Simply stated, the concealing object can be rendered virtually transparent by means of the device.

It is also conceivable for the concealing object to also be a screen. More precisely, the object can be any element in a cabin of a vehicle or of the vehicle itself, i.e. for example also a tyre, bonnet, control console, or the like.

Since, in a field, the utility vehicle usually drives over a lot of bumps and forces therefore act on a vehicle cabin in which the vehicle driver is sitting, the position of the vehicle driver relative to the vehicle cabin changes, particularly as a result of a deflecting vehicle seat. The position of the driver's eye and, accordingly, the portion that is concealed by the object therefore also change. According to the invention, the device therefore has a determination device that is provided and set up to determine a position of at least one eye of the vehicle driver.

Furthermore, the position of the portion also depends on the orientation—i.e. the exact position—of the screen, particularly relative to the utility vehicle cabin. Correspondingly, according to the invention, a different portion is recorded and displayed depending on the position of the screen.

The determination device can determine the position of the portion from the position of the eye and the position of the screen, so that this portion can then be displayed on the screen.

According to an especially preferred embodiment, the determination device has a first sensor and a second sensor, the first sensor being provided and set up to determine the position of the eye relative to a utility vehicle cabin, and the second sensor being provided and set up to determine the position of the screen relative to the utility vehicle cabin.

According to another preferred embodiment, a viewing angle of the eye can additionally be determined by means of the first sensor, and the orientation of the screen relative to the utility vehicle cabin can additionally be determined by means of the second sensor.

According to this embodiment, both the position of the eye of the vehicle driver and the viewing angle of the eye can be determined by means of the first sensor. According to this embodiment, both the position of the screen and the orientation relative to the utility vehicle cabin can be determined by means of the second sensor.

This is particularly advantageous since the portion can also be dependent on the other parameters. Thus, it is conceivable for the position of the eye to remain unchanged even though the viewing angle of the eye changes. Likewise, the portion can also be dependent on the orientation relative to the utility vehicle cabin.

According to another preferred embodiment, the first sensor and the second sensor can each be designed as an infrared sensor.

According to another preferred embodiment, the determination device can determine a distance from the eye to the screen from the position of the eye, particularly relative to the utility vehicle cabin, and the position of the screen, particularly relative to the utility vehicle cabin. Of course, the portion may also be dependent on the distance from the eye to the screen. The closer the screen is to the eye, the more of the field of view of the eye is occupied by the screen. The portion that is displayed on the screen must then also be selected accordingly.

According to another embodiment, the camera setup has exactly one camera unit. According to this embodiment, it is necessary to perform collimation of a focal point of the eye that lies in the portion, and a focal point of the camera unit.

A depth of field can then be set by means of a known algorithm that can be executed by an arithmetic and logic unit, such as a CPU, GPU, CSI, or IC. The following parameters are required for this: Distance from eye to portion, distance from camera setup to portion.

According to an alternative embodiment, the camera setup has two camera units, the two camera units being arranged relative to one another such that stereoscopic imaging of the portion is performed. The stereoscopic imaging of the portion simulates vision with two eyes, so that spatial depth is achieved by superposing the images of a first camera unit and of a second camera unit of the camera setup. Due to the stereoscopic imaging of the portion, it is not absolutely necessary to perform collimation.

In this case, a camera unit preferably comprises an image sensor such as a CCD sensor or a CMOS sensor, a CMOS sensor being preferred. It is also conceivable for a CSI (camera serial interface) to be provided.

The camera setup is preferably connected to the utility vehicle cabin and the camera setup is preferably arranged on the outside of the utility vehicle cabin.

Furthermore, the underlying object is also achieved by a method for displaying a portion on a screen, the portion being concealed by an object and the object being arranged between the portion and a vehicle driver and the screen being arranged between the vehicle driver and the object, and the portion being located in a region recorded by a camera setup, the method comprising the steps of recording of the region by the camera setup; detecting a position of at least one eye of the vehicle driver; detecting a position of the screen; determining the position of the portion in the captured region based on the position of the eye and the position of the screen; and displaying the portion on the screen.

According to an advantageous embodiment, a "deep" view is implemented in the portion, by means of a processing unit, before the method step of displaying the portion. That is, depending on the number of camera units of the camera setup, a "deep" view or a depth effect is added to the recorded image by means of the processing unit.

If exactly one camera unit is provided, collimation of the focal point of the eye and the focal point of the camera unit is carried out by means of a known algorithm using the distance from the eye to the portion and the distance from the camera unit to the portion.

If two camera units are provided, they are preferably arranged stereoscopically. The stereoscopic imaging of the portion simulates vision with two eyes, so that spatial depth is achieved by superposing the images of a first camera unit and of a second camera unit of the camera setup. By virtue of the stereoscopic imaging of the portion, it is not absolutely necessary to perform collimation.

Additional advantageous embodiments can be found in the dependent claims.

BRIEF DESCRIPTION OF THE DRAWINGS

Other aims, advantages and expediencies of the present invention will become apparent from the following description taken in conjunction with the drawings. In the drawings.

DETAILED DESCRIPTION

The parts and components shown in the figures are not to be regarded as being true to scale; rather, the size of some parts or components may be exaggerated in the interest of greater clarity.

Figure 1:
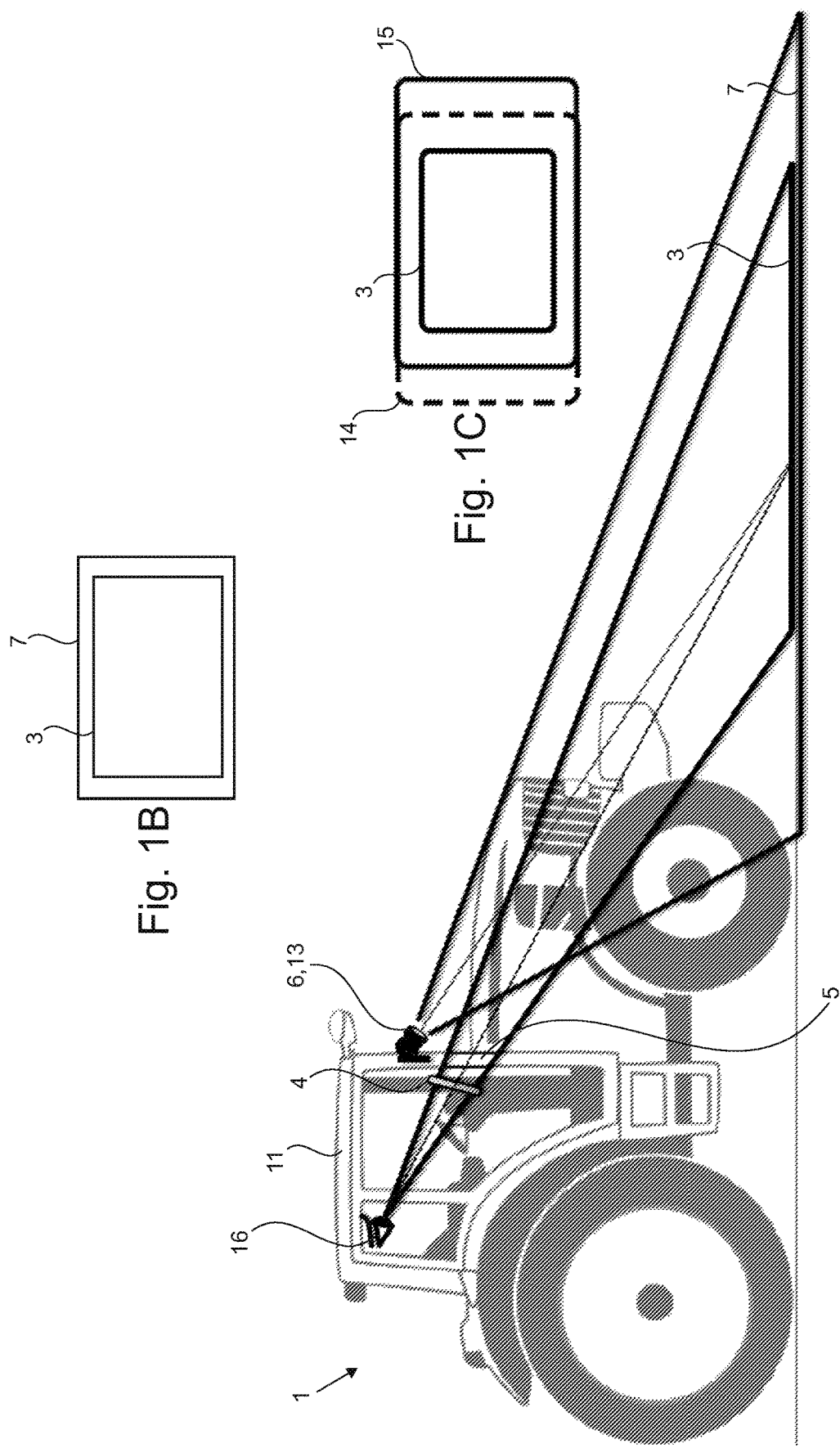
FIG. 1A is a schematic view of a utility vehicle comprising a device.
FIG. 1B is a schematic view of a region and of a portion of a camera setup comprising one camera unit.
FIG. 1C is a schematic view of a region and of a portion of a camera setup comprising two camera units.

FIG. 1A is a schematic view of a utility vehicle 1 comprising a device 2 for displaying a portion 3. As can be seen, a camera setup 6 comprising one or more camera units 13—preferably exactly one and more preferably exactly two camera units—is arranged on a utility vehicle cabin 11 of the utility vehicle 1. The camera setup 6 is in particular arranged on the outside 14 of the utility vehicle cabin 11. As can be seen, a region 7 in which a portion 3 is arranged can be recorded by the camera setup 6. In this case, the portion 3 is a region that is concealed from the vehicle driver (represented here by his eye 16) by an object 5 (a pillar of the utility vehicle cabin 11 in the present case) at least in part and cannot be seen. For this purpose, according to the invention, the portion 3 is to be displayed on a screen 4, as a result of which, to put it simply, the concealing object 5 is rendered transparent.

To make this possible, the object 5 is arranged between the screen 4 and the portion 3, and the screen 3 is arranged between the vehicle driver and the object 5.

FIGS. 1B and 1C show the region 7 having the portion 3 in one possible position within the region 7. FIG. 1B shows the region 7 of a camera setup 6 comprising exactly one camera unit 13, whereas FIG. 1C shows the region 7 of a camera setup 6 comprising two camera units 13. Since the camera units 13 are arranged stereoscopically, the first camera unit 13 has a first region 14 and the second camera unit 13 has a second region 15 that overlap at least in part and together form the region 7.

Figure 2:
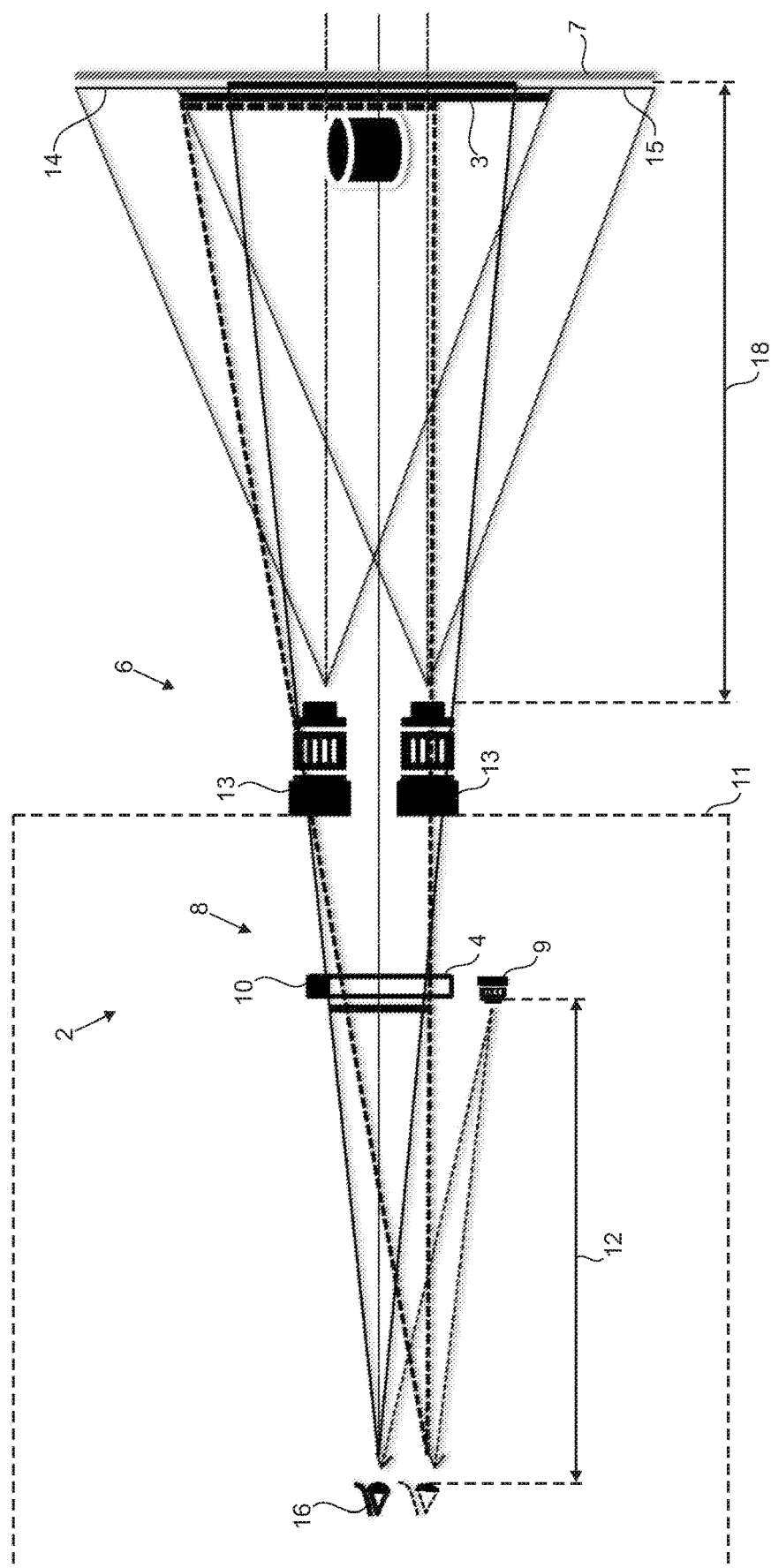
FIG. 2 is a schematic view of the device comprising two camera units.

FIG. 2 schematically shows a structure of the device 2, the determination device 8 having a first sensor 9 and a second sensor 10, the first sensor 9 being set up and provided to determine the position of the eye 16 relative to the utility vehicle cabin 11 and, optionally, the viewing angle of the eye 16, and the second sensor 10 being set up and provided to indicate the position of the screen 4 relative to the utility vehicle cabin 11 and, optionally, the orientation of the screen 4 within the utility vehicle cabin 11. Preferably, the first sensor 9 is arranged in the vicinity of or near the screen 4 or on the screen 4 in order to thus be able to detect the viewing angle of the eye 16 as precisely as possible. More preferably, the second sensor 10 is arranged on the screen 4 in order to thus determine the position or orientation of the screen 4 as precisely as possible.

According to FIG. 2, the camera setup 6 comprises a first camera unit 13 having a first region 14 and a second camera unit 13 having a second region 15, the camera units being arranged in a stereoscopic manner and the first region 14 and the second region 15 overlapping in part. Of course, the position of the portion 3 within the region 7 depends on the distance 12 from the eye 16 to the screen 4 and the distance 18 from the camera setup 6 to the region 7. The closer the eye 16 is to the screen 4, the larger the portion 3 that is to be displayed. The same applies analogously to the distance 18 from the camera unit 6 to the region 7 and/or the portion 3. The greater the distance 18, the larger the portion 7.

The dashed lines in FIG. 2 show the situation in which the position of the eye 16 relative to the utility vehicle cabin 11 changes. As a result, the position of the portion 3 within the region 7 changes accordingly.

Figure 3:
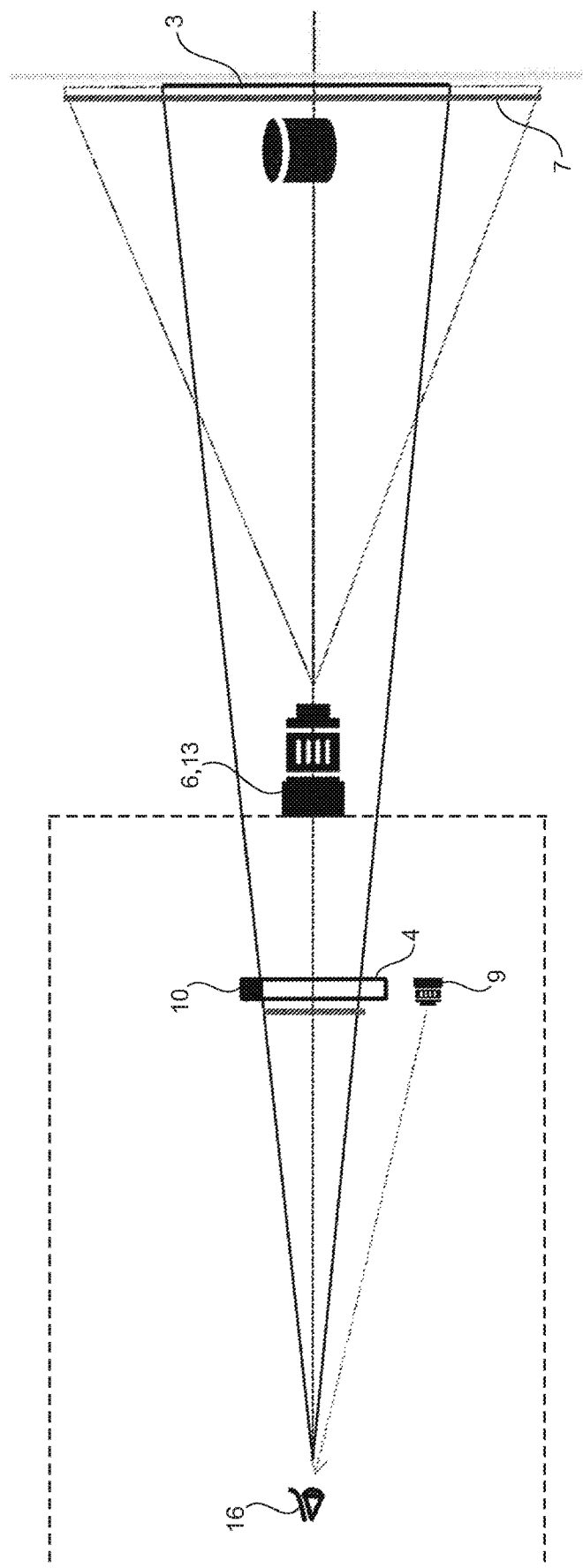
FIG. 3 is a schematic view of the device comprising one camera unit.

FIG. 3 shows an embodiment that is similar to that of FIG. 2, but in which the camera setup 6 comprises exactly one camera unit 13. The explanations concerning the respective components correspond to those made in the description of FIG. 2, except that no stereoscopic arrangement of the camera units 13 is possible, since only a single camera unit 13 is provided.

Figure 4:
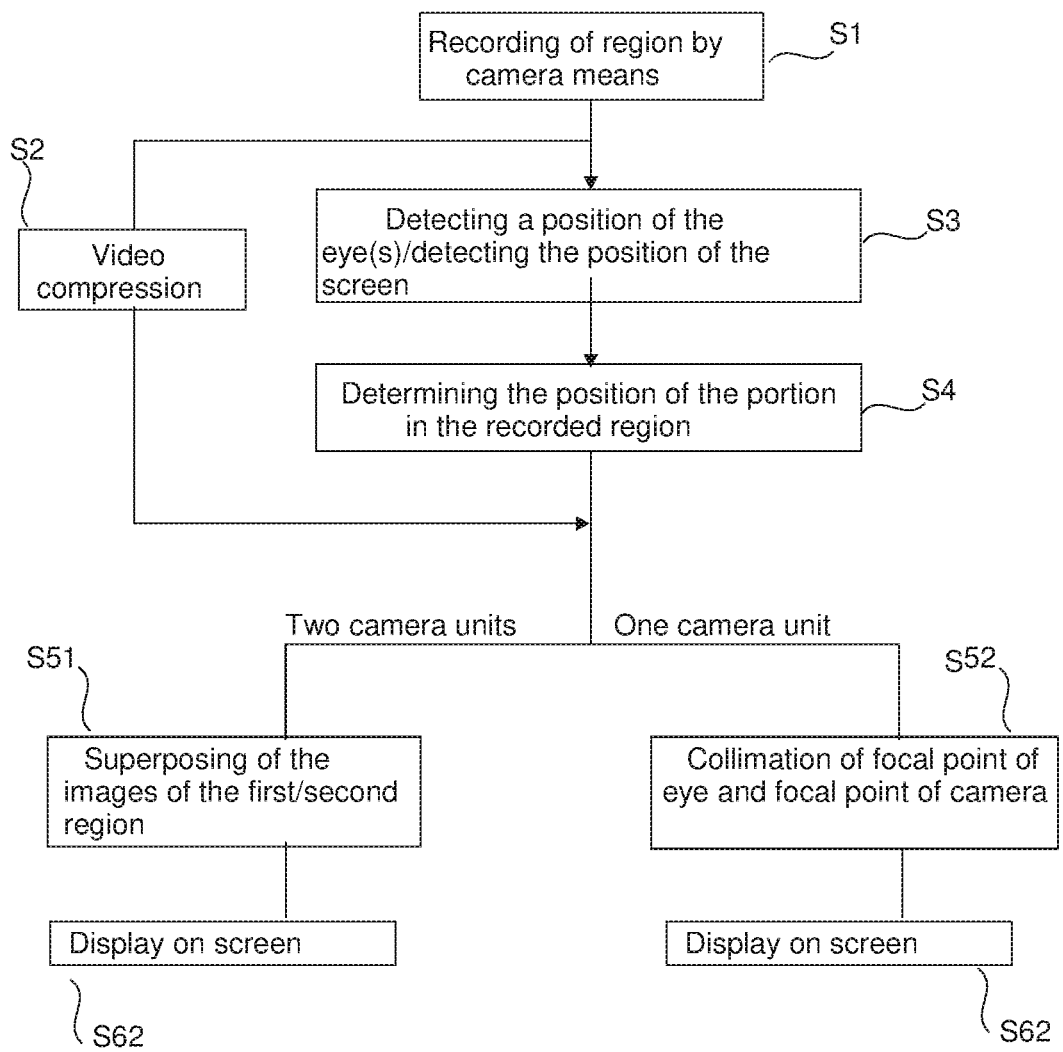
FIG. 4 shows a flowchart of a method according to one embodiment.

FIG. 4 describes a possible method for displaying a portion on a screen, the portion being concealed by the object, the object being arranged between the portion and the vehicle driver, and the screen being arranged between the vehicle driver and the object.

In a first step S1, the region 7 is recorded by the camera setup 6; in particular, this is a video recording. Preferably, the region 7 is continuously recorded. In a further step S2, the video recording is compressed and, in a further step S3, the position of the eye/eyes 16 and the position of the screen 4, relative to the utility vehicle cabin 11 in each case, are determined by the determination device 8, preferably by means of the first sensor 9 and the second sensor 10. It is also conceivable here for the viewing angle of the eye and the orientation of the screen relative to the utility vehicle cabin 11 to also be determined.

From these data, which are determined in step S3, the position, and in particular the size, of the portion 3 within the recorded region 7 can be determined, particularly by means of a processing device (not shown here).

The method continues, using the compressed video recording of step S3 and the portion determined on the basis of the screen and the eye of step S4, depending in turn on the number of camera units 13.

If the camera setup 6 has exactly one camera unit 13, then, in a step S52, it is necessary to perform a collimation of a focal point of the eye that lies in the portion, and a focal point of the camera unit. A depth of field can then be set by means of a known algorithm that can be executed by an arithmetic and logic unit, such as a CPU, GPU, CSI, or IC. The following parameters are required for this: Distance from eye to portion, distance from camera setup to portion. A corresponding depth effect is implemented in the video recording. Subsequently, the processed video recording is displayed on the screen in a step S62, particularly by video streaming.

If the camera setup 6 has two and preferably exactly two camera units 13 that are arranged stereoscopically, the image of the first camera unit 13 and the image of the second camera unit 13 are superposed by the processing unit (not shown here) in a step S51, thus producing a depth effect. In a step S61, the processed video recording is displayed on the screen, particularly by video streaming.

All of the features disclosed in the application documents are claimed as being essential to the invention if they are novel over the prior art, individually or in combination.

LIST OF REFERENCE SIGNS 1 utility vehicle
2 device
3 portion
4 screen
5 object
6 camera setup
7 region
8 determination device
9 first sensor
10 second sensor
11 utility vehicle cabin
12 distance from eye to screen
13 camera unit
14 first region
15 second region
16 eye
17 outside of utility vehicle cabin
18 distance from camera setup to region

What is claimed is:

1. A utility vehicle, comprising:
a device for displaying a portion on a screen, the portion being concealed by an object at least in part, and the object being arranged between the portion and a vehicle driver and the screen being arranged between the vehicle driver and the object, the portion being located in a region that is recorded by a camera setup,
wherein the device has a determination device having a first sensor and a second sensor,
wherein the first sensor is provided and set up to determine a position of at least one eye of the vehicle driver relative to a utility vehicle cabin,
wherein the second sensor is provided and set up to determine a position of the screen relative to the utility vehicle cabin,
wherein the first and second sensors are mounted on the screen,
wherein the determination device determines a position of the portion in the recorded region using the position of the at least one eye and the position of the screen,
wherein the portion is displayed by the screen,
wherein, with the at least one eye determined by the first sensor to be at a first eye position and the screen determined by the second sensor to be at a first screen position, the position of the portion in the recorded region displayed by the screen is a first portion position,
wherein, with the at least one eye determined by the first sensor to be at the first eye position and the screen determined by the second sensor to be at a second screen position, the position of the portion in the recorded region displayed by the screen is a second portion position differing spatially from the first portion position,
wherein, with the at least one eye determined by the first sensor to be at a second eye position and the screen determined by the second sensor to be at the first screen position, the position of the portion in the recorded region displayed by the screen is a third portion position differing spatially from the first portion position, and
wherein, with the at least one eye determined by the first sensor to be at the second eye position and the screen determined by the second sensor to be at the second screen position, the position of the portion in the recorded region displayed by the screen is a fourth portion position differing spatially from each of the first portion position, the second portion position and the third portion position.

2. The utility vehicle according to claim 1, wherein a viewing angle is additionally determined by the first sensor and a location of the screen relative to a utility vehicle cabin is additionally determined by the second sensor.

3. The utility vehicle according to claim 1, wherein the first sensor is an infrared sensor, and wherein the second sensor is an infrared sensor.

4. The utility vehicle according to claim 1, wherein the determination device determines a distance from the at least one eye to the screen from the position of the at least one eye and the position of the screen.

5. The utility vehicle according to claim 1, wherein the camera setup has exactly one camera unit.

6. The utility vehicle according to claim 1, wherein the camera setup has two camera units, the two camera units being arranged relative to one another such that a stereoscopic imaging of the portion is performed by the camera setup.

7. The utility vehicle according to claim 1, wherein the portion is entirely concealed by the object.

8. A method for displaying a portion on a screen, the portion being concealed by an object and the object being arranged between the portion and a vehicle driver, and the screen being arranged between the vehicle driver and the object, the portion being located in a region that is recorded by a camera setup, wherein the method comprises:
  recording the region by the camera setup;
  detecting a position of at least one eye of the vehicle driver by a first sensor of a determination device;
  detecting a position of the screen by a second sensor of the determination device, wherein the first and second sensors are mounted on the screen;
  determining a position of the portion in the recorded region based on the position of the at least one eye and the position of the screen; and
  displaying the portion on the screen, wherein, with the at least one eye determined by the first sensor to be at a first eye position and the screen determined by the second sensor to be at a first screen position, the position of the portion in the recorded region displayed by the screen is a first portion position,
  wherein, with the at least one eye determined by the first sensor to be at the first eye position and the screen determined by the second sensor to be at a second screen position, the position of the portion in the recorded region displayed by the screen is a second portion position differing spatially from the first portion position,
  wherein, with the at least one eye determined by the first sensor to be at a second eye position and the screen determined by the second sensor to be a the first screen position, the position of the portion in the recorded region displayed by the screen is a third portion position differing spatially from the first portion position, and
  wherein, with the at least one eye determined by the first sensor to be at the second eye position and the screen determined by the second sensor to be at the second screen position, the position of the portion in the recorded region displayed by the screen is a fourth portion position differing spatially from each of the first portion position, the second portion position and the third portion position.

9. The method according to claim 8, wherein a depth effect is implemented in the portion by a processing unit before the method step of displaying the portion.

10. A vehicle, comprising:
  a display device comprising a screen;
  a camera; and
  a determination device comprising a first sensor and a second sensor,
  wherein:
    the camera obtains an image of a region,
    the region includes a portion that is at least partially concealed by an object positioned between the region and a vehicle driver,
    the display device displays the portion of the region imaged by the camera on the screen,
    the screen is located between the vehicle driver and the object,
    the first sensor determines a position of at least one eye of a vehicle driver relative to a utility vehicle cabin and a viewing angle,
    the second sensor determines a position of the screen relative to the utility vehicle cabin,
    the first sensor and the second sensor are mounted on the screen,
    the determination device determines a position of the portion in the region displayed on the screen using the position of the at least one eye and the position of the screen,
    when the first sensor determines the at least one eye to be in a first eye position and the second sensor determines the screen to be in a first screen position, the determination device displays the position of the concealed portion in a first position,
    when the first sensor determines the at least one eye to be in the first eye position and the second sensor determines the screen to be in a second screen position, the determination device displays the position of the concealed portion in a second position differing spatially from the first position,
    when the first sensor determines the at least one eye to be in a second eye position and the second sensor determines the screen to be in the first screen position, the determination device displays the position of the concealed portion in a third position differing spatially from the first position, and
    when the first sensor determines the at least one eye to be in the second eye position and the second sensor determines the screen to be in the second screen position, the determination device displays the position of the concealed portion in a fourth position differing spatially from each of the first position, the second position and the third position.

11. The vehicle according to claim 10, wherein the camera is arranged on the outside of the utility vehicle cabin.

12. The vehicle according to claim 10, wherein the first sensor is an infrared sensor, and wherein the second sensor is an infrared sensor.

13. The vehicle according to claim 10, wherein the determination device determines a distance from the at least one eye to the screen.

* * * * *